United States Patent [19]
Smith et al.

[11] Patent Number: 4,554,677
[45] Date of Patent: Nov. 19, 1985

[54] QUEUED COMMUNITY REPEATER CONTROLLER

[75] Inventors: Paul F. Smith, Fort Worth; Eric Schorman, Bedford; Timothy M. Burke, Fort Worth; Charles N. Lynk, Jr., Bedford, all of Tex.

[73] Assignee: Motorola, Inc., Schaumburg, Ill.

[21] Appl. No.: 564,634

[22] Filed: Dec. 22, 1983

[51] Int. Cl.⁴ .............................................. H04B 1/00
[52] U.S. Cl. ........................................ 455/54; 455/17; 455/34; 455/58; 340/825.5
[58] Field of Search .................. 455/7, 11, 17, 18, 33, 455/34, 53, 54, 58, 78; 370/93, 95, 89, 85; 340/825.5, 825.51; 179/2 EB

[56] References Cited

U.S. PATENT DOCUMENTS 3,233,221 2/1966 Perlin et al. .
3,745,462 7/1973 Trimble .
3,746,991 7/1973 Gautney .
3,955,140 5/1976 Stephens et al. .
4,012,597 3/1977 Lynk, Jr. et al. .
4,013,959 3/1977 Patterson .
4,135,156 1/1979 Sanders, Jr. et al. .
4,247,947 1/1981 Miyamoto .
4,332,027 5/1982 Malcolm et al. ...................... 455/58
4,414,661 11/1983 Karlstrom ............................ 370/95
4,477,809 10/1964 Bose ...................................... 455/54

FOREIGN PATENT DOCUMENTS 2063011 5/1981 United Kingdom .

Primary Examiner—Jin F. Ng
Attorney, Agent, or Firm—Donald B. Southard; Raymond A. Jenski

[57] ABSTRACT

A communications system central controller which regulates the access of a plurality of remote units to a single communications channel is disclosed. The central controller establishes a period of time wherein a remote unit may request service following the transmission of another remote unit. The central controller interprets the remote unit request for service, stores the request, and grants permission for the remote unit to transmit its message in accordance with the priority in the storage means. The grant of service is revoked by the central controller after a predetermined period of time following the conclusion of the remote unit transmission.

17 Claims, 16 Drawing Figures

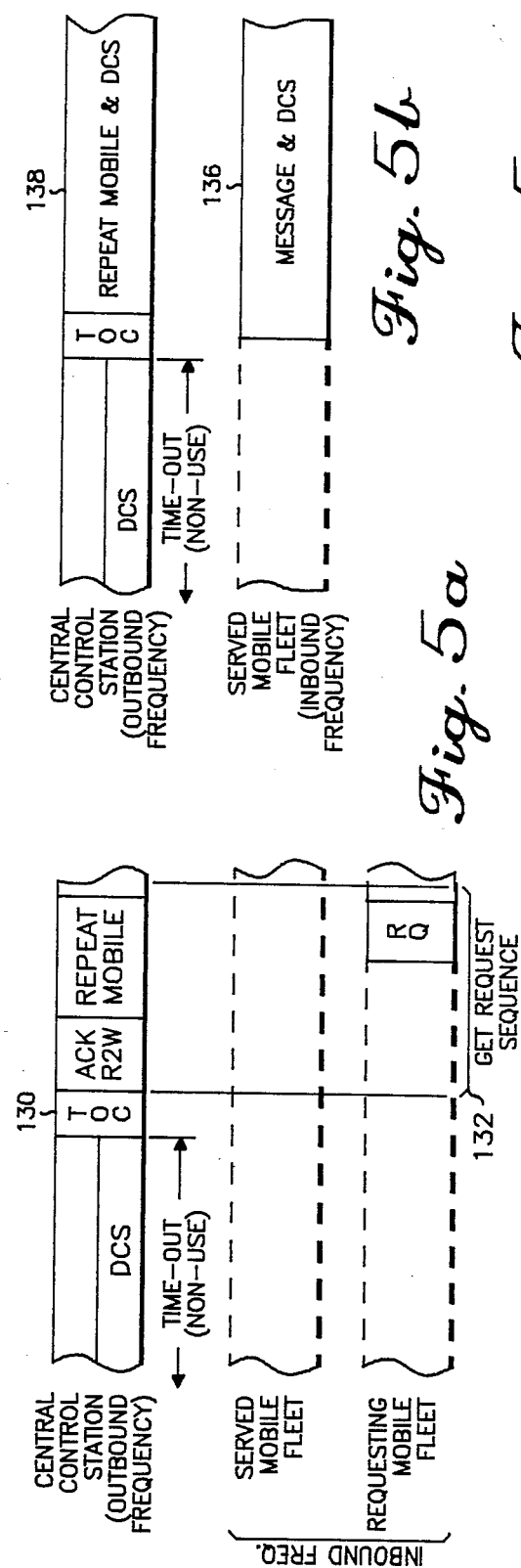
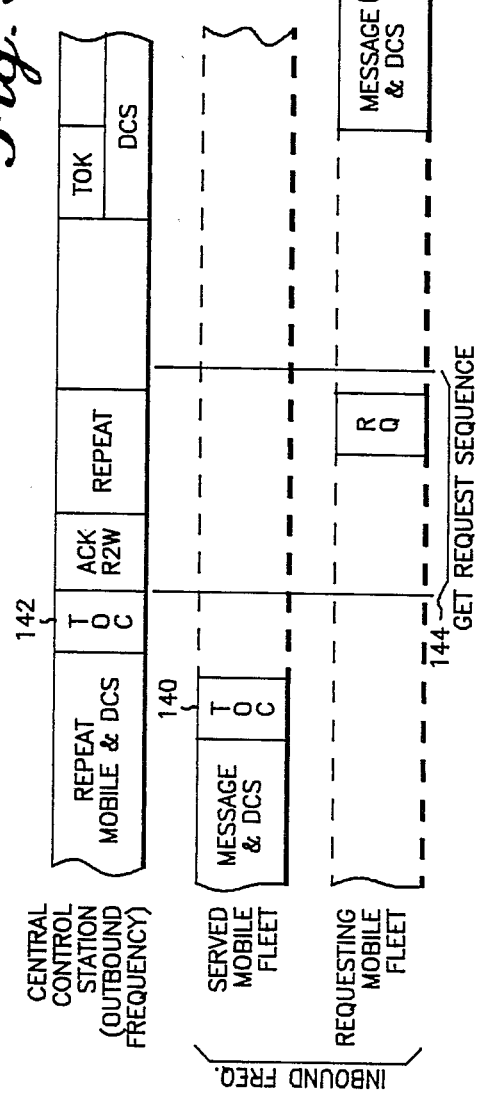
Fig. 5a
Fig. 5b
Fig. 5c

QUEUED COMMUNITY REPEATER CONTROLLER

BACKGROUND OF THE INVENTION

This invention relates to communications system controlling devices and in particular a controlling device for a single channel radio communications system. Reference is made to two additional co-pending applications, Ser. Nos. 564,950 and 564,855, filed on the same date as the present invention and containing related subject matter.

Direct mobile-to-mobile radio communication is limited in range by low antenna heights and relatively low power transmitters. In order to overcome these limitations and cover larger geographical areas, the concept of a single channel "community repeater" has developed whereby a receiver is coupled to a higher power transmitter at a location of favorable radio propagation. Signals from a mobile radio transmitter are received by the community repeater receiver and routed to the community repeater transmitter for rebroadcast to receiving mobiles. Many diverse groups of mobile users in the same community can utilize the same "repeater" by transmitting and receiving on the appropriate frequencies. Generally, the type of communication on a community repeater is a "push-to-talk, release-to-listen" message transmission of short duration between one mobile user and a kindred group of at least one other mobile user.

Crowded conditions can develop on the single communications channel as many different groups consisting of many mobile users attempt to use the channel. Common courtesy is often abandoned as mobile users transmit simultaneously in an effort to capture the channel and communicate their message. Mobile users who listen for a message directed to them or their group are exposed a cacophony of messages which are not of interest and may obscure the desired message.

To improve this situation, a number of developments, which are now well known, have been made. Special coding schemes utilizing continuous subaudible signals or precursor signals are transmitted by a mobile to activate a controller at the community repeater enabling the retransmission function. These signals also activate, via the repeater, other mobiles in a common communications grouping known as a fleet. Directed calls of this sort reduce annoyance to the mobile user for he no longer has to listen to every message on the channel, but they add to his operating burden as he must monitor the channel before transmitting. Also, even with the code activated repeater controller, access to the channel remains uncontrolled and contentious.

The repeater controller, in the well known coordinated multi-channel radio systems, utilizes computer mediated allocation of a plurality of radio channels to a large number of mobile transceivers. Service requests from the mobiles are transmitted to the repeater controller on signalling channels designated to receive the request. Permission to transmit and specification of which channel to use are returned to the mobiles on the signalling channels. The coordination and balance of requests for service and message transmission, which is necessary on a single channel, is neither necessary nor addressed in the multi-channel protocol. Consequently, although coordinated multi-channel controllers are effective in reducing contention, the multi-channel protocol used by these controllers is unsuitable for a single channel controller.

In addition to radio systems, the expanding field of multi-terminal processing has also generated an extensive need for sharing a scarce resource, i.e. a computer processor, among a large number of users. Time-sharing systems, which have been developed as a result of this need, typically place both request for service and message in a storage queue where they are subsequently analyzed by an allocation mechanism for eventual assignment to the computer processor. Unlike the present invention, which must coordinate the requesting process with real time message transmission on the single communications channel, the scarce computer processor resource is aloof from the requesting process and operates on the message in other than real time.

The central controller disclosed herein operates in the Queued Community Repeater (QCR) Communication System disclosed in co-pending application Ser. No. 564,950. The present invention, for the first time, affords real time community repeater users relief from the aggravations of a crowded communications channel. Users' satisfaction improves once contention for this channel is handled automatically and once necessary user manipulations of the mechanics involved in obtaining service on the channel are reduced. In addition, channel efficiency is increased as more mobiles can be accommodated on the single communications channel due to the automated control exercised.

SUMMARY OF THE INVENTION

Accordingly, a primary object of this invention is & to provide means for controlling real time communications between a multitude of remote units on a single communications channel.

Another object of this invention is to reduce remote unit contention for the channel.

Another object of this invention is to place requesting remote unit fleet identifications in a queue for orderly assignment to the channel.

Another object of this invention is to control and limit the remote unit channel occupation time.

These and other objects are achieved in the present invention by a central controller which, inter alia, regulates the access of a plurality of remote units to a single communications channel. A period of time is established by the central controller on the single channel following the detection by the central controller of the transmission end of one of the served remote units. Remote units may request permission to transmit a message on the channel during this period of time. The central controller interprets the remote unit request for service, stores the request, and grants permission in accordance with the priority in a request storage means. The grant of service is revoked by the central controller after a predetermined period of time following the aforementioned transmission end detection.

BRIEF DESCRIPTION OF THE DRAWINGS

FIG. 5a is a relative timing diagram of channel activity showing time-out non-use.

FIG. 5b is a continuation of 5a showing a missed time out non-use signal and continued mobile unit message transmission.

FIG. 5c is a relative timing diagram of channel activity showing a time-out for exceeding the maximum allowed time.

DETAILED DESCRIPTION OF THE PREFERRED EMBODIMENT

The preferred embodiment of the invention is a Queued Community Repeater (QCR) Controller, which is part of a central control station for the QCR system. The QCR Controller receives coordinated requests for service from members of groups of remote units called fleets, places these requests in a queue for orderly service, and allocates a single communications channel for use by each fleet in turn. This communications channel is a pair of radio frequencies separated from each other such that mutual interference is avoided. Transmissions from remote unit to a central control station occur on one "inbound" radio frequency and transmissions from the central control station occur on a second, "outbound", radio frequency. When the channel is allocated to a fleet of remote units, one remote unit of the fleet transmits a message on the inbound frequency. The central control station receives the message and retransmits it to the receiving remote units of the fleet on the outbound frequency. Control signals from the central control station and requests for service from the remote units are also transmitted on the outbound and inbound frequencies respectively.

Figure 1:
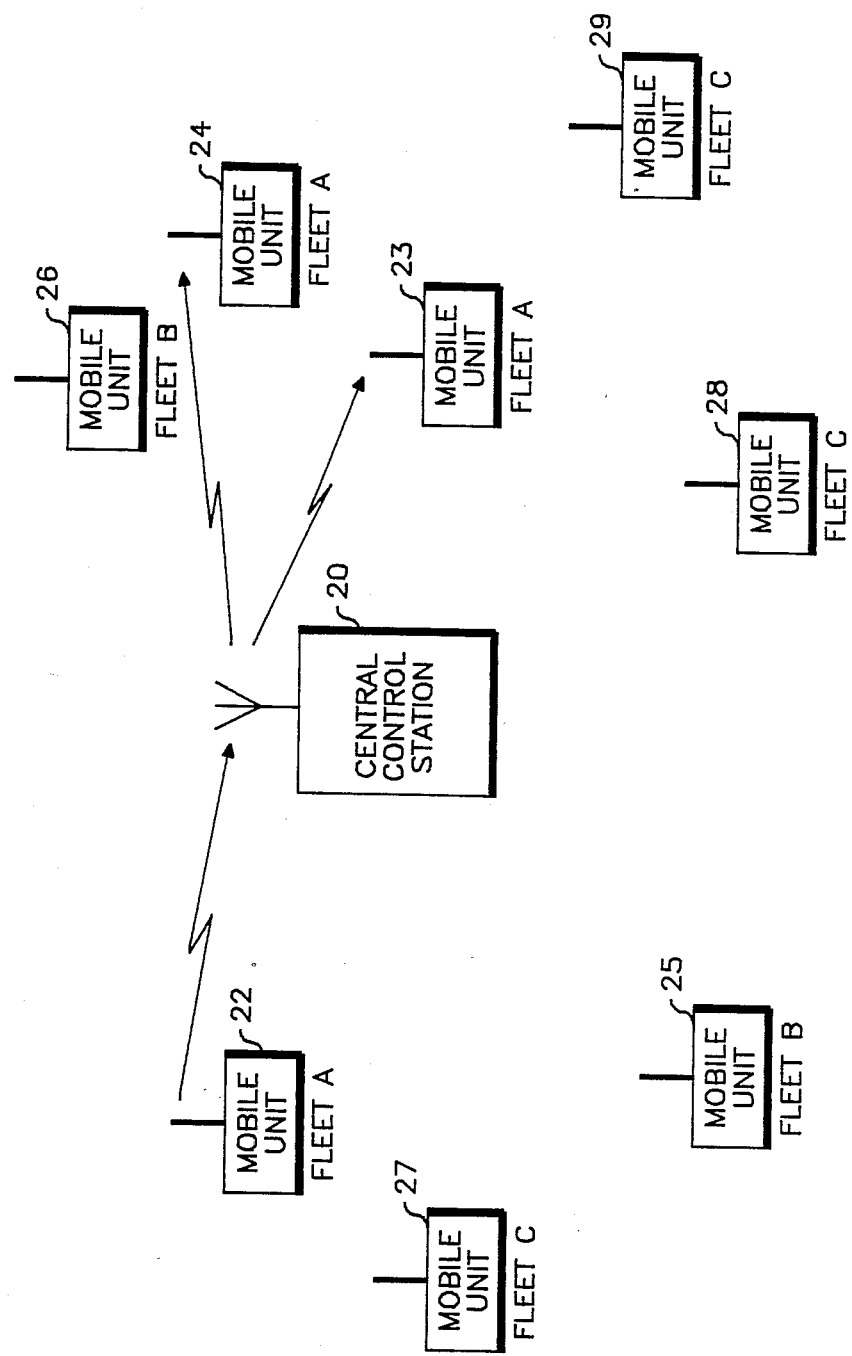
FIG. 1 depicts a queued Community Repeater System with three groups of mobile units.

Referring to FIG. 1, three fleets of remote units, which in this embodiment are predominantly units located in transportation vehicles but could also be hand-held portable units or fixed units and hereinafter called mobiles, are depicted in the radio coverage area of a central control station 20. Fleet A is composed of mobiles 22, 23, and 24. Similarly, fleet B is composed of mobiles 25 and 26, and fleet C is composed of mobiles 27, 28 and 29. Mobile 22 of fleet A is transmitting a message which is repeated by the central control station 20 to the other mobiles of Fleet A. When mobile 22 completes its transmission, the central control station 20 provides a period of time wherein a mobile from another fleet may request permission to use the channel. Following this period of time, the channel is re-assigned to fleet A for a possible reply message from one of the other fleet A mobiles.

Figure 2:
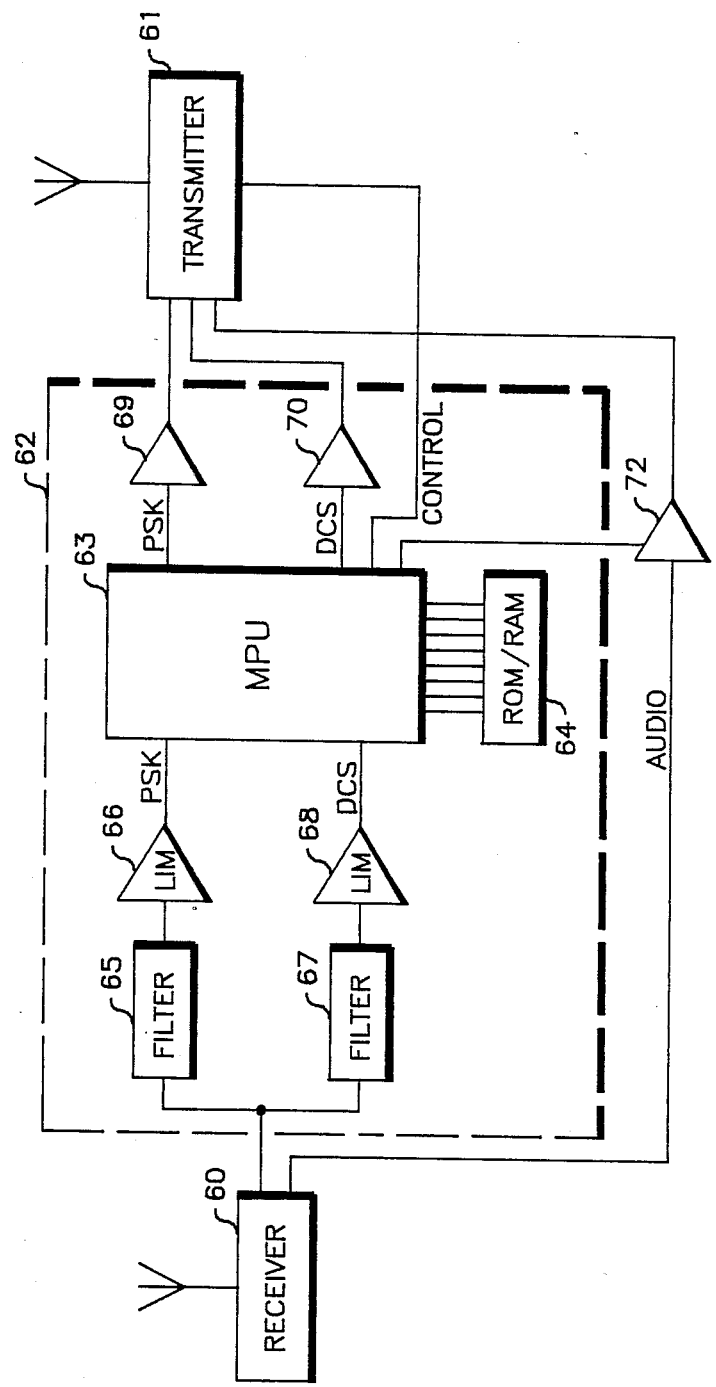
FIG. 2 is a block diagram of a QCR Central Control Station.

Referring to FIG. 2, the central control station 20 is composed of three main components: a repeater receiver 60, a repeater transmitter 61 and a microprocessor-based controller 62 hereinafter called a QCR Controller. Receiver 60 and transmitter 61 are well known in the art except in this system they are adapted to be under the control of QCR Controller 62. The QCR Controller 62 consists of a microprocessor 63, associated RAM and ROM 64, a PSK signalling filter 65 and limiter 66, a 150 bps subaudible digital code signal (DCS) signalling filter 67 and limiter 68, an output amplifier for PSK signalling 69, and an output amplifier for DCS signalling 70. The QCR Controller receives both the PSK signalling and the subaudible DCS transmitted from a mobile unit via repeater receiver 60 and appropriate filters and limiters. The QCR controller outputs PSK signalling and DCS for transmission by repeater transmitter 61 to mobile units via output amplifiers 69 and 70. In this embodiment, the PSK speed is 600 bps.

Requests for service from mobiles are received by repeater receiver 60 after the microprocessor 63, directed by instructions from ROM/RAM 64, sends a PSK "acknowledge" signal via output amplifier 69 and repeater transmitter 61 to all mobiles monitoring the outbound frequency. Coordinated by this "acknowledge" signal, mobiles whose users have pushed a push-to-talk (PTT) button on their mobile unit indicating a desire to transmit a message can request permission to transmit by transmitting a PSK request signal. When the channel is not busy, the mobiles are so informed by the central controller, and need not wait for synchronizing signals.

The microprocessor 63 processes the PSK request and places the requesting mobile's fleet identification in a first-in, first-out (FIFO) queue in ROM/RAM 64. When the requesting mobile fleet's turn appears, the microprocessor 63 transmits a transmit OK (TOK) PSK signal (via output amplifier 69 and repeater transmitter 61) to the requesting mobile's fleet and simultaneously transmits the unique fleet DCS code (via output amplifier 70 and repeater transmitter 61). The fleet mobiles detecting either the PSK TOK with their fleet ID or their unique DCS are thus enabled and one of the fleet mobiles may transmit.

The microprocessor 63 recognizes a proper DCS code transmitted by the mobile, enables the gate 72 allowing transmitter 61 to retransmit the mobile message and DCS received by receiver 60, and ceases to generate fleet DCS. At the conclusion of the mobile message the microprocessor 63 detects a loss of the proper DCS or detects a DCS Turn-Off Code (TOC) transmitted by the mobile and reinitiates the "acknowledge" sequence. Hereinafter, "detecting TOC" may refer to either actual detection of the TOC or loss of the proper DCS.

Figure 3:
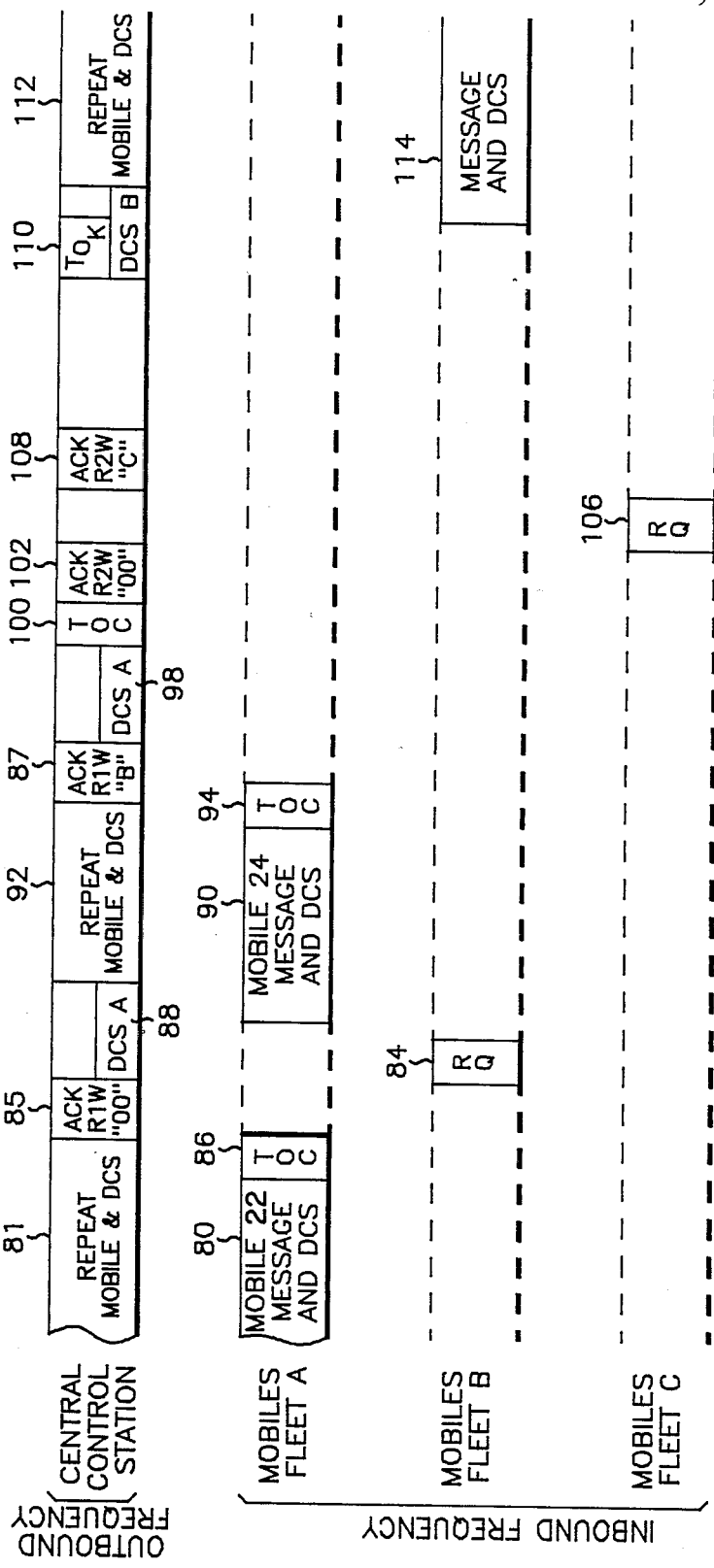
FIG. 3 is a relative timing diagram of the control signals and messages occurring on the channel.

A relative timing diagram for a hypothetical system usage, FIG. 3, provides a clearer illustration of the exchange of control signals between the QCR Controller 62 and mobiles in the coverage area. In this example, mobile 22 of fleet A is transmitting a message and DCS 80 on the inbound frequency which is repeated 81 by the repeater transmitter 61 on the outbound frequency. Users of mobiles not currently having permission to transmit on the channel, however, may request permission to transmit on the channel during synchronized periods established by the QCR Controller 62. The QCR Controller 62 acknowledges these requests and places the fleet ID's in a FIFO Queue. When the active fleet relinquishes the channel (or when they have exceeded their allotted time) the QCR Controller 62 deactivates the fleet and allocates the channel to the first member of the queue. A member of the newly deactivated fleet may again request service and be placed at the end of the queue.

To prevent the requests for service from interferring with the ongoing conversation of the active fleet, the QCR Controller 62 synchronizes the request sequence to occur in the gap between the voice transmission of the active fleet, fleet A.

All fleets that are not active have the receiver audio disabled in each mobile. Users cannot listen to the conversations of the active fleet, and do not know who, if anyone, is using the channel. In this controlled system, the mobile user does not have to monitor the channel before making a request.

When the user of a fleet B mobile pushes the push-to-talk (PTT) switch indicating a desire to communicate a message to the other members of fleet B, a request for service message 84 is delayed by the mobile until a synchronizing signal 85 is transmitted from the central control station 20. This synchronization signal is an "acknowledge", which is transmitted from the repeater transmitter 61 and QCR Controller 62 when the Controller detects an end-of-transmission TOC 86 sent by a fleet A mobile when the mobile user releases the PTT switch.

Following an "acknowledge" 85, mobile 25 from fleet B transmits the request for service (RQ) 84 to the QCR Controller 62. An "acknowledge" to fleet B is not made by QCR Controller 62 at this time, but a subaudible DCS code 88, which is unique to fleet A, is transmitted from QCR Controller 62 via repeater transmitter 61. The DCS code 88 causes the muted fleet A mobiles to be re-enabled at the time the fleet B request is finished. The mobiles of fleet A are muted and prevented from transmitting by the data occurring in the gap between transmissions and must wait for the re-authorizing DCS before they may again transmit.

Another mobile 24 of fleet A begins transmitting a message 90 to the mobiles of fleet A via the central control station 20 following the re-authorization DCS code 88. Concurrent with the message of mobile 24, the subaudible DCS code identical to that transmitted from the central control station is transmitted by mobile 24. This mobile transmitted code is detected by QCR Controller 62 which responsively ceases generation of DCS "A" and causes the central control station 20 to repeat 92 both the mobile message 90 and the DCS "A" generated by mobile 24. Detection of DCS alone is sufficient to enable all mobiles of the fleet corresponding to the particular DCS code transmitted. In this respect, the QCR Controller utilizes a signalling scheme more like a "continuous" than a "preamble" scheme. The continuous signalling allows a mobile which did not receive the initial permission to transmit signal to unmute the receiver and enable the transmitter when the proper DCS code is detected. The user is then able to hear part of the message. This recovery of a "lost" mobile into an ongoing conversation is an valuable aspect of the QCR controller.

Two types of "acknowledge" signals are employed for non-data message transmission: ACKR1W and ACKR2W. The first is an "acknowledge" of a previous request and a solicitation for a new request for service to be taken on the inbound frequency in a "window" of time immediately following the ACKR1W. The second "acknowledge" confirms a previous request and solicits new requests for service in one of two overlapping time windows randomly selected by the mobile unit so that contention will be minimized. An ACKR2W is repeated in a sequence called "get request" until no further requests are received, thereby increasing the rate at which requests may be gathered after fleet message exchanges are finished on the channel.

When the user of the mobile 24 releases the push-to-talk switch at the end of the message 90, an end-of-transmission TOC 94 is generated. This TOC, as TOC 86 before, triggers the QCR Controller 62 to transmit an ACKR1W "acknowledge" 87, containing the identification of the last requesting mobile fleet-fleet B in this example and soliciting other requests for service.

Following ACKR1W "acknowledge" 87, the QCR Controller 62 transmits fleet A's DCS code 98 to allow mobiles in fleet A to continue use of the channel. Since no fleet A mobile transmits on the channel, a matching DPL code from a fleet A mobile is not detected at the QCR Controller 62. After a predetermined period of time, the QCR Controller 62 transmits a TOC 100 to deactivate fleet A mobiles and an ACKR2W "acknowledge" 102 notifying all mobiles that requests for service will be accepted before the channel is allocated to fleet B. Any mobiles which were unable to request service during the transmission gaps of fleet A can be added to the queue before reallocation of the channel. In this instance, no new mobile requests for service were received following the previous ACKR1W "acknowledge" 87 and the queue contains only one mobile request (of fleet B) so a dummy ID "00" is transmitted with the ACKR2W 102.

A mobile from fleet C responds to ACKR2W 102 with a request 106 which causes the QCR Controller to transmit an ACKR2W acknowledge 108 with fleet C's identification. This sequence will continue indefinitely as long as requests are received.

Since no additional mobiles respond to the ACKR2W 108 of the "get request" sequence, the QCR Controller 62 selects the proper DCS code of the next mobile fleet in queue, fleet B. This DCS code is transmitted by the central control station 20 concurrently with a permission to transmit (TOK) command 110 with the ID number of fleet B. The TOK is sent for two reasons: it takes other fleets out of a "channel clear" condition to be described later, and it informs mobiles requesting data service that they missed their allocation and should request again.

As the TOK 110 is completed, the QCR Controller 62 continues to send fleet B DCS on the outbound frequency and looks for an identical DCS on the inbound frequency. When the DCS code from a fleet B mobile is detected, the "handshake" is complete, and the central control station 20 stops transmitting fleet B DCS and begins to repeat 112 the incoming fleet B DCS and message 114. Listening fleet B mobiles decode their DCS and are enabled irrespective of whether the DCS code is generated or repeated by the central control station 20. The use of DCS as the authorization allows mobiles to join their fleet's conversation in progress if they power-on or come into range after the initial allocation.

To the non-requesting mobile, all requets, assignments, and messages involving other fleets are ignored. Acknowledgements and other messages involving its own fleet are monitored. Thus, the mobile knows the precise status of its fleet at all times. The mobile user, however, is not aware of (and not burdened by) the status until an actual message is heard on the channel. The mobile knows if its fleet is in the queue but not active. If this user subsequencetly presses the PTT switch to make a request, an actual request is not transmitted since the unit knows that its fleet is already in the queue. Thus, only one request per fleet is normally made and contention is greatly reduced.

Figure 4A:
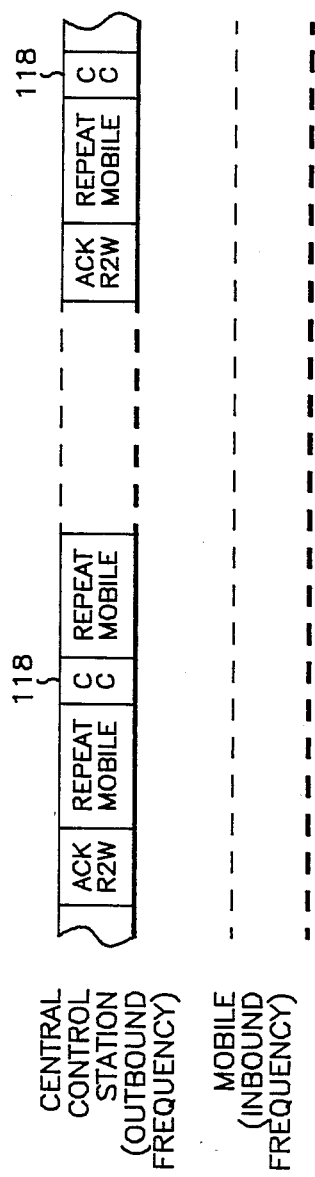
FIG. 4a is a relative timing diagram of channel activity when the QCR Central Control Station is in the "channel clear" mode.

Referring now to FIG. 4A, when there are no fleets in the queue and when the channel is not allocated, the QCR Controller 62 sends out a "channel clear" command 118. This "channel clear" 118 command is transmitted periodically at 30 second intervals and is used by the mobiles as a "keep alive" function.

Figure 4B:
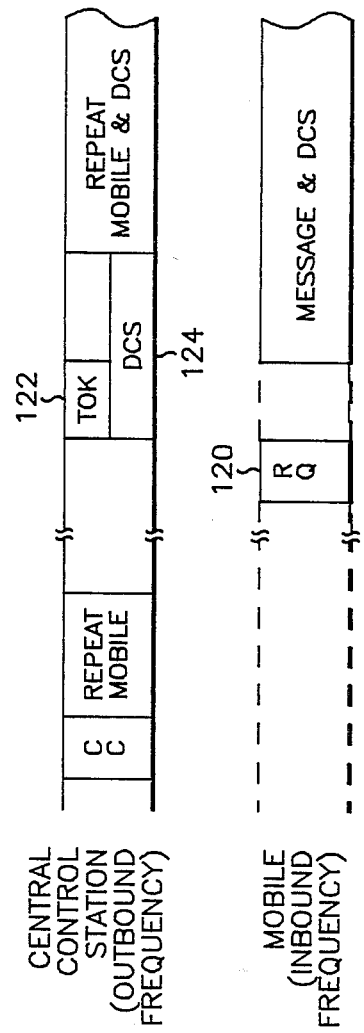
FIG. 4b is a continuation of 4a showing a mobile unit requesting service during the "channel clear" mode.

As shown in FIG. 4B, a mobile does not have to wait for an "acknowledge" before requesting service when the system is in a "channel clear" condition. When a mobile in the channel clear condition sends a request 120, it receives a TOK data packet 122, which also takes other fleets out of the "channel clear" condition, along with a superimposed DCS code 124 which authorizes the requesting fleet. A TOK may thus be considered as a "non-channel clear" command, as well as an enabling transmit OK.

Referring to FIGS. 5A, 5B, and 5C, the central control station 20 performs two time out (TO) functions to deactivate a currently active fleet. A fleet may be timed out for not utilizing the channel (non-use) or for exceeding the maximum time allowable (max-time). When the QCR Controller 62 assigns the channel to a fleet, it starts a time-out non-use (TONU) timer for the fleet. If, as in FIG. 5A, no fleet mobiles respond within the time-out time, as determined by DCS detection, the QCR Controller 62 transmits TOC 130 as a time-out and muting function thereby revoking the grant of service. If a served fleet DCS is not detected by the QCR Controller 62 following the time-out, the QCR Controller 62 adopts a "get request" sequence 132 to solicit requests for service from another fleet.

If a served fleet DCS 136 is detected, FIG. 5B, (a mobile missed the time-out TOC) but the fleet did not yet exceed its maximum allowed time, the QCR Controller 62 will reassign the channel to the fleet by repeating the incoming DCS code 138 to enable the other mobiles. If the maximum allowed time were exceeded, the central control station waits until the mobile DCS drops and performs another time-out to disengage the fleet. When the fleet assignment is revoked, the central control station may make a new assignment.

A fleet is allowed a maximum amount of time during an exchange of messages which in this embodiment is in the order of 60 seconds. When the time expires, as in FIG. 6C, the QCR Controller 62 waits for the next end-of-transmission TOC 140 transmitted from the mobile and subsequently checks the status of the queue. If the queue is occupied, the QCR Controller 62 transmits a time-out TOC 142, a "get request" sequence 144 is activated, and the channel is subsequently allocated to the first member in the queue. If the queue is unoccupied, the QCR Controller 62 does not deactivate the current fleet but waits for the next end-of-transmission signal and checks the status of the queue again.

Detailed consideration must now be given to a number of processes previously discussed in conjunction with the timing diagrams. Microprocessor flowcharts of the QCR Controller are shown in order that the operation of the present invention be fully understood:

1. Channel Clear.

Figure 6:
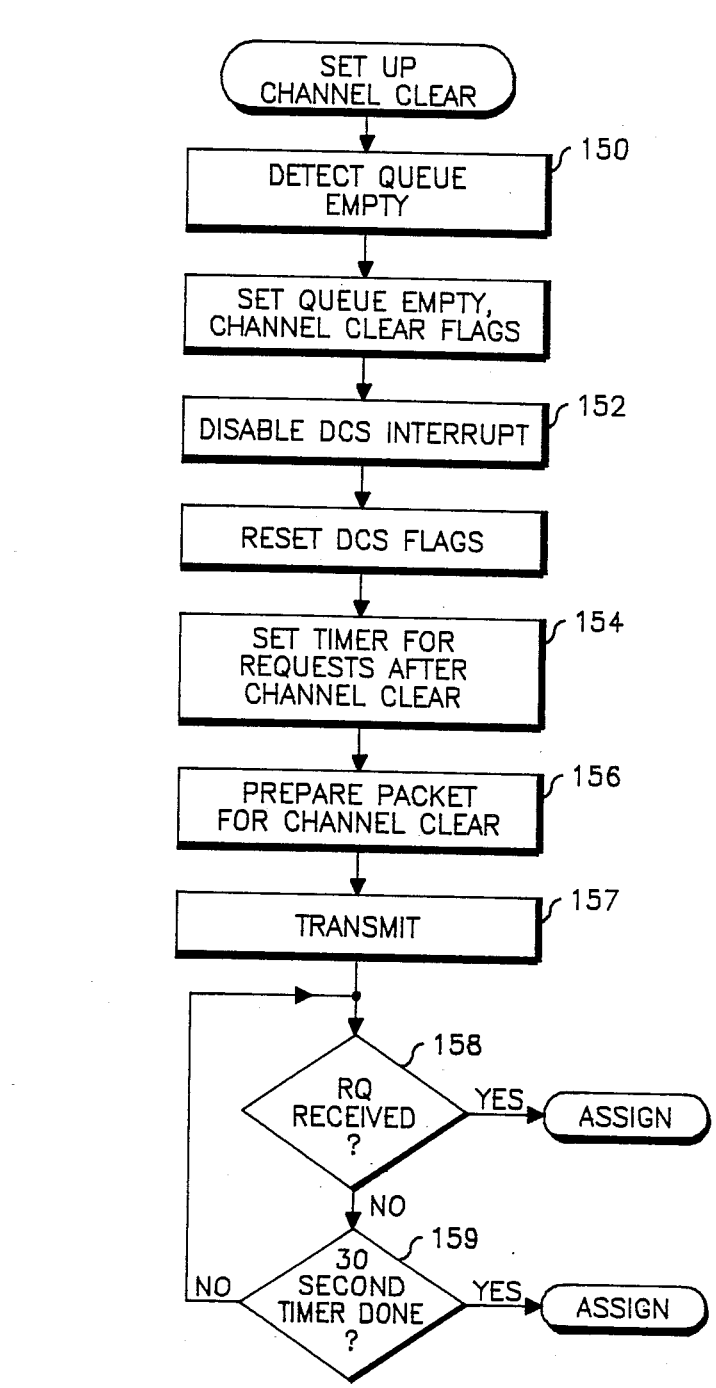
FIG. 6 is a QCR Controller flowchart for the "channel clear" subroutine.

Referring to FIG. 6, when there are no fleets in the queue and when the channel is not allocated, the QCR Controller sends out the "channel clear" command. Channel clear is transmitted periodically, for example every 30 seconds as a "keep alive" feature to inform mobiles that the system is operational, and that a mobile receiving a channel clear is in radio range. If a mobile does not receive valid QCR Controller data for two minutes, the mobile until will disable the transmitter. If the mobile is simply out of range, when it comes within range and is able to detect the signal again, it will revert to normal operations. If the mobile cannot receive signals due to some mechanical or electrical problem, the keep alive feature will disable the transmitter to prevent it from disrupting other mobiles in the system.

Under the channel clear condition, a mobile does not have to wait for a "acknowledge" before requesting service. When a mobile in the channel clear condition sends a request, it receives a TOK data packet to take other fleets out of channel clear and a superimposed DCS code to authorize the requesting fleet.

As shown in FIG. 6, the sequence of steps followed by the QCR Controller is detecting the presence of an empty queue 150, preventing DCS interrupts of the routine 152, preparing to accept and process a mobile request 154, preparing and transmitting a channel clear signal 156, 157. If a request is received 158 the Assign routine will allocate the channel, or after the 30 second keep alive period 159, the Assign routine will restart the Channel Clear routine.

2. Requests.

When the channel is being utilized by a fleet, requests from other fleets are synchronized to come in during the intertransmission gap. The synchronization signal is an "acknowledge" which is transmitted by the QCR Controller when it detects a DCS turn-off code (TOC) sent by the mobile when the user releases his PTT switch. The two-way signalling between voice transmissions is called the intra-gap signalling (IGS). To minimize the IGS time, the QCR Controller delays the acknowledge for a particular request until the following IGS. The synchronizing "acknowledge" includes confirmation of the request from the previous IGS, or if there was no request, a dummy ID is transmitted with the "acknowledge".

Figure 7:
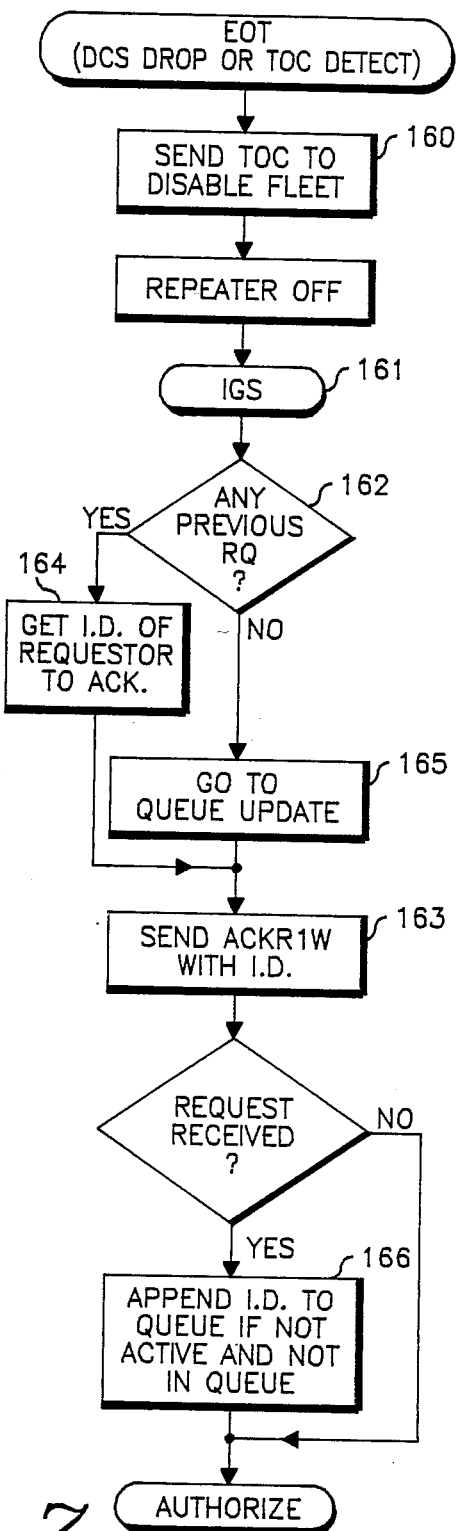
FIG. 7 is a QCR Controller flowchart for the end-of-transmission and intragap signalling subroutines.

Referring to FIG. 7, the End of Transmission (EOT) routine is entered when the controller detects loss of DCS or detects TOC. The QCR controller then transmits TOC 160 briefly to ensure that the fleet is disabled. Upon the QCR Controller entering the IGS sequence, 161, it first checks storage for a previous request 162 which must be acknowledged. It then transmits an "acknowledge" 163 with either a previous requesting mobile fleet ID 164 or a mobile fleet ID in the waiting queue 165 as an update. The QCR controller awaits a request response to the "acknowledge" and if one is received, the requesting mobile fleet ID is added to that queue if its fleet ID is not already there, 166. Whether or not a request was received, the QCR Controller "authorize" routine will transmit the original fleet's DCS code again at the proper time so that the fleet will be reenabled by the time a request packet is finished. The mobiles will be muted and disabled by the data occurring in the gap and must wait for the re-authorizing DCS before they may transmit.

Figure 8:
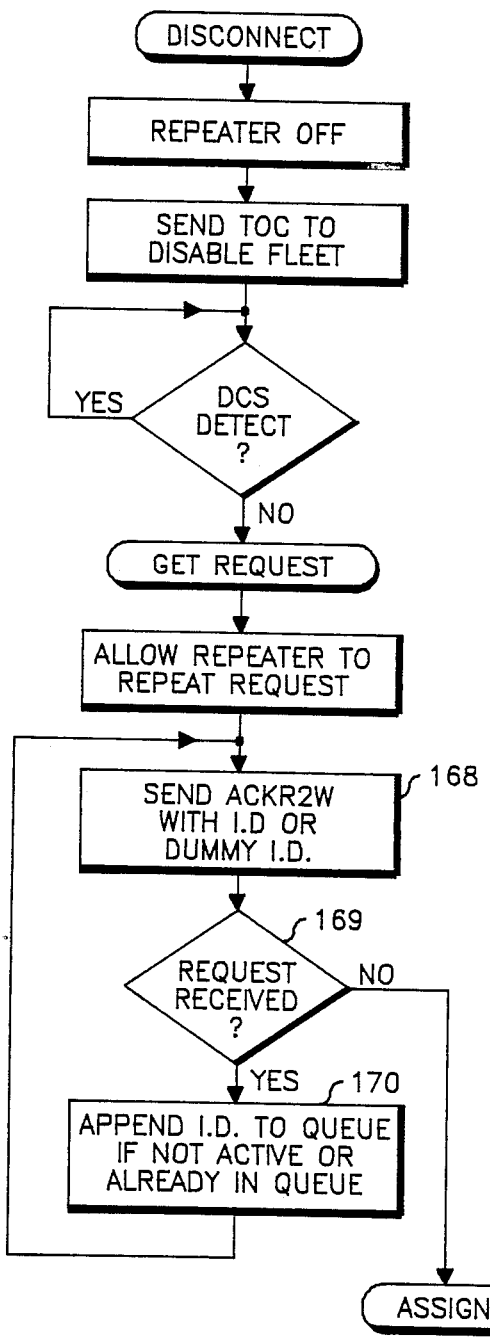
FIG. 8 is a QCR Controller flowchart for the disconnect and "get request" subroutines.

After an active fleet has been deactivated and before the channel is allocated to another fleet, the QCR Controller initiates request sequences so that additional fleets can be added to the queue before re-allocation of the channel. Referring to FIG. 8, the QCR Controller initiates this "get request" sequence by sending an "acknowledge" 168 with a dummy ID in the ID field. If a request comes in 169, the QCR Controller appends the ID to the queue 170 and sends the "acknowledge" 168 with the ID of the requesting fleet, and allows more requests to come in. The QCR Controller continues to acknowledge the incoming requests until none is received in any sequence. At this time the channel is allocated to the first fleet in the queue via the assign routine.

3. Queue Updates.

Figure 9:
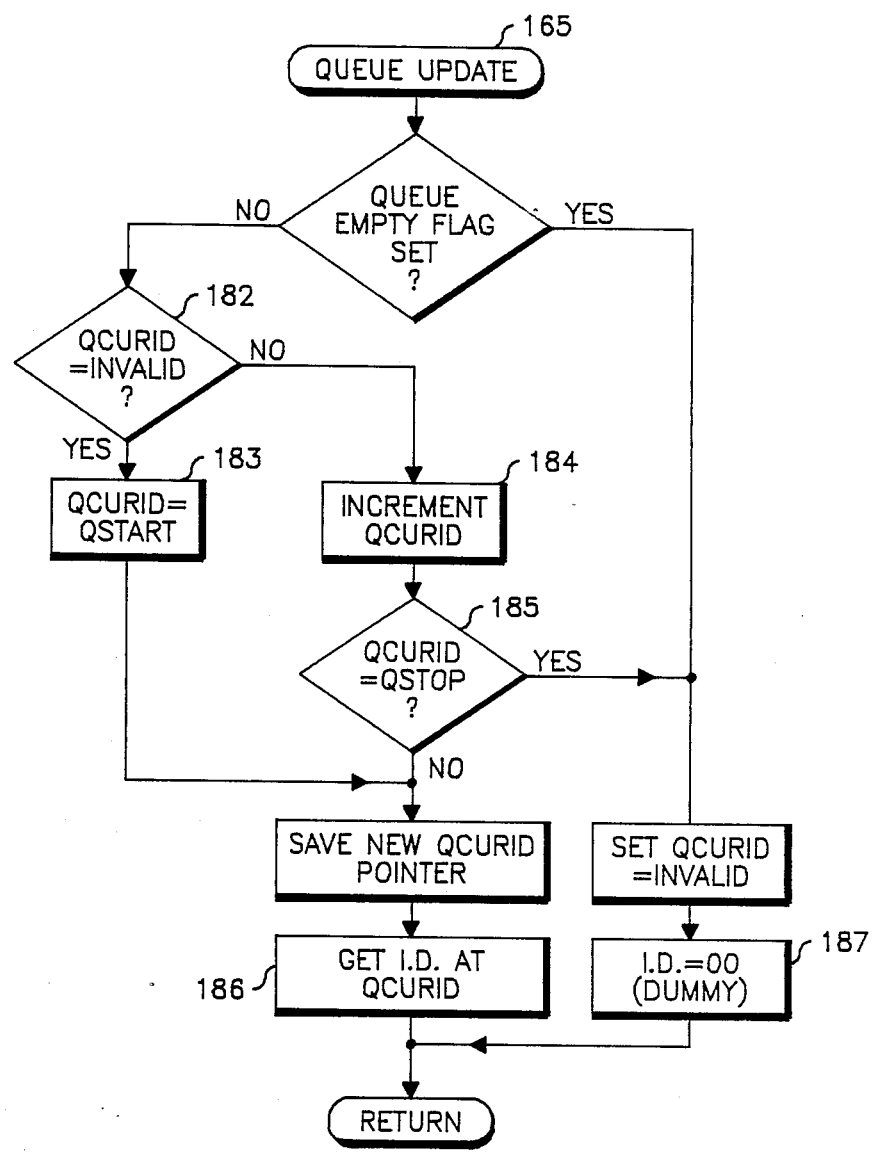
FIG. 9 is a QCR Controller flowchart for the queue update subroutine.

As previously mentioned, the "acknowledge" signal not only confirms requests, but also triggers requests during the IGS and "get request" periods. Referring again to FIG. 7, when requests in the IGS sequence must be triggered and there are no requesting mobiles 162 which must be acknowledged, an "acknowledge" is sent with a dummy ID established by the Queue Update subroutine 165. Typically, this dummy ID is always "00", which is an invalid ID for a fleet. Instead, the system uses this opportunity to update one of the fleets in the queue. Each time the QCR Controller needs a dummy ID, it selects the next ID in the queue and acknowledges that fleet. Referring to FIG. 9, the selection process starts at block 182 which tests the value of pointer QCURID for an invalid pointer value. If an invalid value is found, the pointer is reset 183 to the start of the requesting mobile queue. If QCURID is not invalid (which means more requesting mobile fleet ID's are in the queue and at least one ID has been recalled from the queue and updated), the pointer is incremented by one, 184. QCURID is tested for reaching the end of the queue 185 and if it is not at the end, the fleet ID located at the storage locations indicated by QCURID is made available 186 for updating at the next "acknowledge" signal. When the end of the queue is reached, "ID 00" is used as a delimiter 187. The Queue Update routine will inform all mobiles of the fleet ID's which are in the queue. One fleet will be updated during each IGS if no new requestor needs to be acknowledged. The "ID 00" delimiter indicates that the entire queue has been updated. Thus, a mobile which thinks it is in the queue may re-request if it decodes two "acknowledge" signals with an ID "00" without receiving an "acknowledge" with its ID between them.

This type of queue update could be done with either the ACKR1W during the IGS or the ACKR2W during the "get request" sequence, or both. For simplicity, and because of the low throughput of the latter, only the IGS ACKR1W opportunity is used for queue updates in the preferred embodiment. The ACKR2W always use the dummy ID of "00" when there is no previous request.

4. Authorization.

Figure 10:
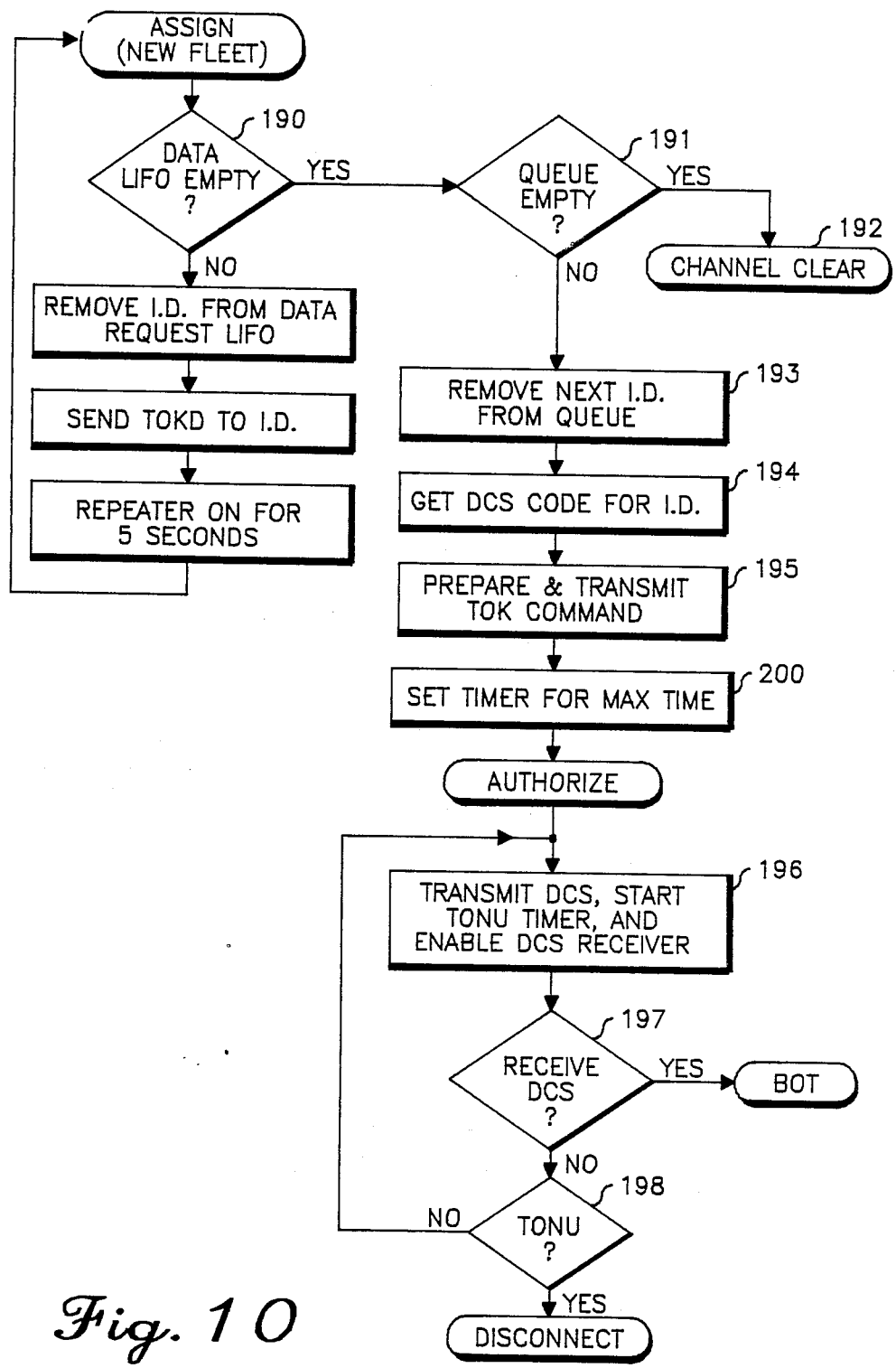
FIG. 10 is a QCR Controller flowchart for the assign and authorize subroutines.

When the QCR Controller is ready to reassign the channel, it follows the "assign" and "authorization" routine as diagrammed in FIG. 10. The Controller decides 190, 191 whether any mobile requests remain in the queue. If the queue is empty, the channel clear routine is established 192. If requests remain in the queue, the QCR Controller recalls the next fleet in the FIFO queue 193, selects the DCS code associated with the recalled fleet 194, prepares the TOK command 195, and transmits both the DCS code and the PSK TOK command. After the TOK has been transmitted, the DCS 196 will be continually transmitted while attempting to detect the mobile DCS 197 on the receive channel.

Decoding either the TOK or the DCS is sufficient to enable the mobiles of the selected fleet. The mobiles of that fleet become active, that is, their audio is unmuted and the transmitters are enabled. Should one of the mobiles being transmitting, it will transmit the same DCS code to the QCR Controller on the inbound frequency. The QCR Controller will decode the incoming DCS 197, and the Beginning of Transmission Routine will be entered. If DCS is not received from the mobile, a time-out non-use (TONU) timer 196 is started, and the disconnect routine will be entered when the timer times out.

Figure 11:
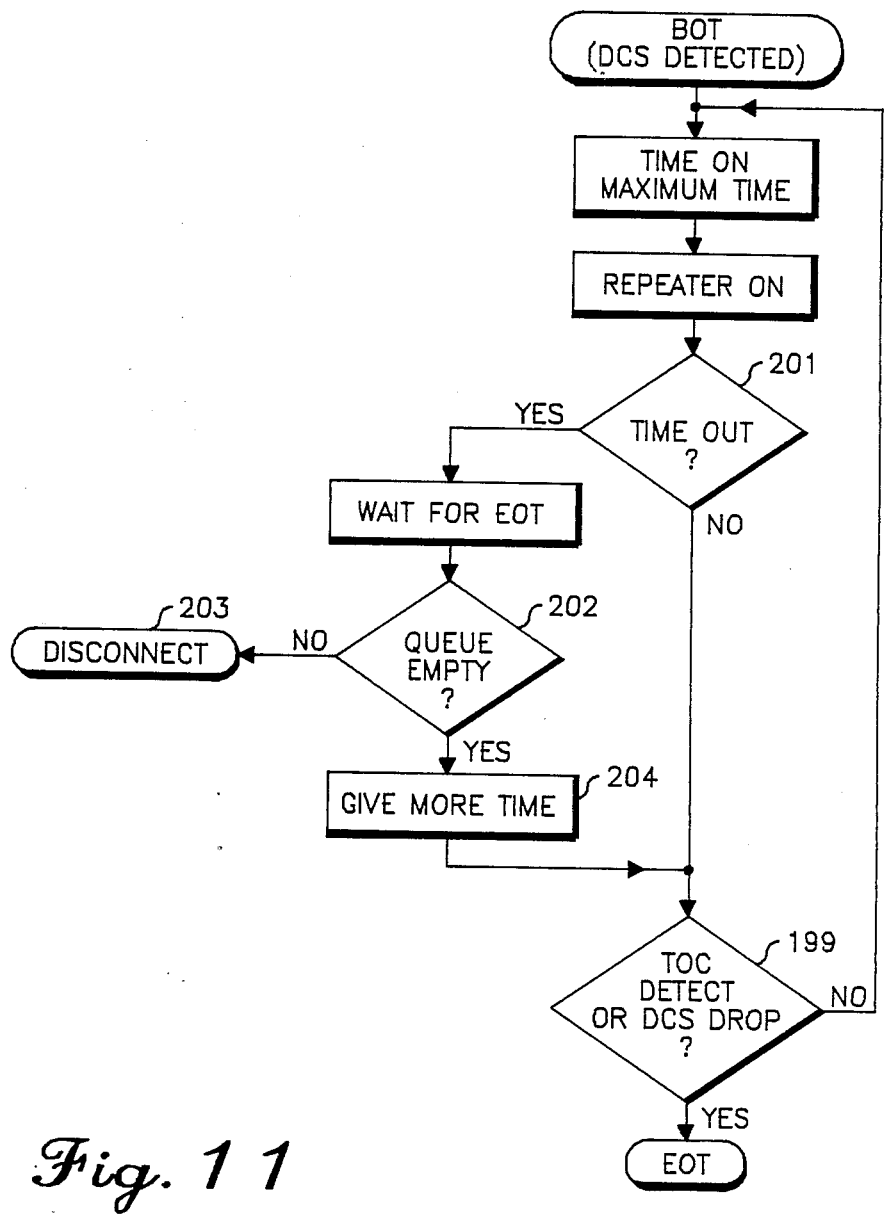
FIG. 11 is a QCR Controller flowchart for the beginning-of-transmission subroutine.

When reception of the proper DCS causes the BOT routine to be entered, the controller will caue the incoming voice and DCS to be repeated. Referring to FIG. 11, if the continuous DCS detect is lost or TOC is detected 199, the End of Transmission routine will be entered.

5. Timers.

The QCR Controller times both the active periods and the inactive periods of message transmission activity of a fleet's channel allocation. The controller will deactivate the fleet when the maximum allowed message time is exceeded. It will also deactivate the fleet if any pause between transmissions exceeds a "time-out-non-use" (TONU) time.

When a fleet is allocated the channel, a timer 200, FIG. 10, is set and that fleet can transmit messages and maintain access to the channel for a maximum of 60 seconds if others are waiting in the queue. Referring to FIG. 11, when the time expires 201, the QCR controller waits for the next end of transmission and then checks the status of the queue 202. If the queue is occupied, the disconnect sequence 203 is started. When a fleet is successfully timed out, the QCR controller performs a "get request" sequence before allocating the channel to the first fleet in the queue.

If the queue is unoccupied, the QCR Controller does not deactivate the current fleet but provides more time 204. The QCR Controller then waits for the next end of transmission and again checks the status of the queue. Additional time will continue to be granted until a request is made by a mobile of another fleet.

In addition to the maximum time out, the QCR Controller starts the TONU timer 196, FIG. 10, when a fleet is assigned a channel. If a mobile does not respond within the time out time, as determined by DCS detection, the fleet is deactivated. If one does respond, subsequent transmissions are similarly timed to allow channel reuse when the conversation ceases or pauses excessively. Rather than have a fixed TONU for all transmissions, the QCR Controller adjusts the TONU to the circumstances, that is, whether or not other fleet ID's are waiting in the queue. In this embodiment, the non-use time out times are as follows when the system is busy (the queue is not empty):

6 seconds, following the authorization,
6 seconds, following the first end-of-transmission,
2 seconds, following subsequent end-of-transmissions.

If the system is not busy (the queue is empty), the times are:

2 seconds, following the authorization,
6 seconds, following the first end-of-transmission,
2 seconds, following the subsequent end-of-transmissions.

This approach reduces the dead time in a non-busy system caused by mobile users "checking the channel". The six second first try in a busy system gives the requestor time to pick up the microphone after a possibly long wait after the request was made. If the system were not busy, the user probably did not wait long and should still have the microphone in hand. The second time out under both conditions is long to allow the called mobile time to respond to the caller. The third and subsequent times are short since both, or all, of the mobiles are already engaged in the conversation.

Figure 12:
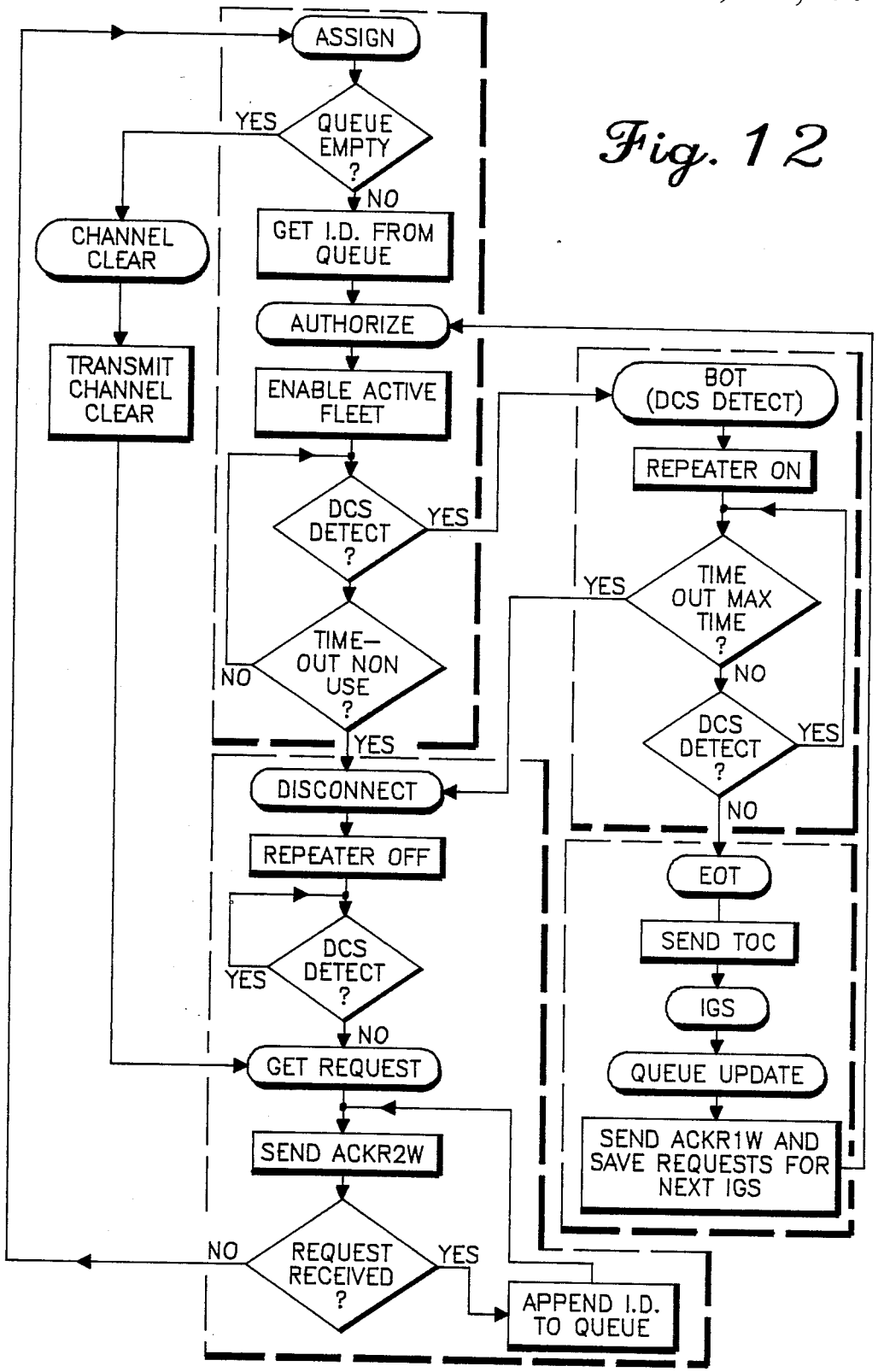
FIG. 12 is a QCR Controller flowchart showing an integration of the subroutines into an operating protocol.

The aforementioned processes are integrated to form a QCR Controller operating protocol as shown in FIG. 12.

Figure 13:
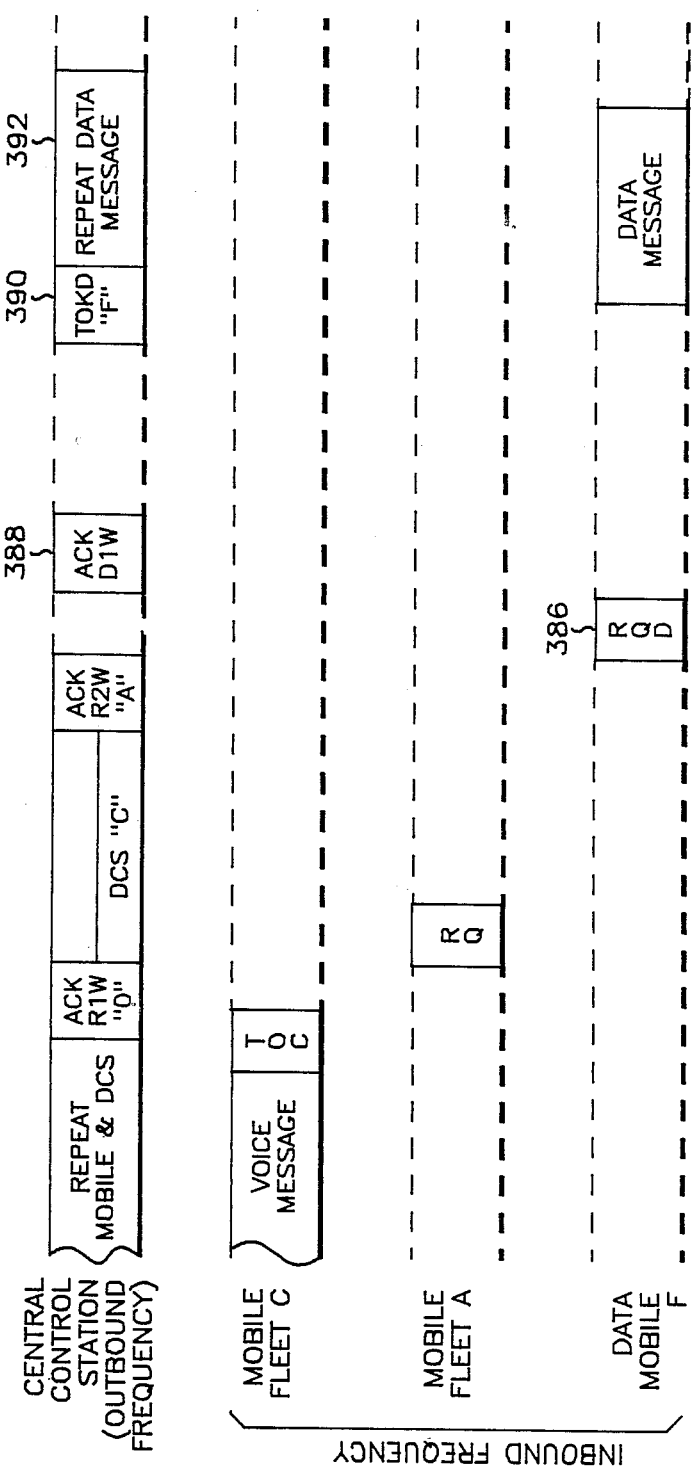
FIG. 13 is a relative timing diagram of channel activity showing a data mobile request and message.

In addition to voice messages, which have been the primary focus of this description, the QCR Controller has the capability of allocating channels for data messages. The timing diagram of channel activity is shown in FIG. 13 for a data message request.

The QCR Controller uses special op codes such as RQD, ACKD1W, and TOKD to control the channel for data communication. A data mobile sends RQD 386 to request data service. The QCR Controller places the requesting data mobile fleet ID in a last-in-first-out stack which is separate from the FIFO voice queue. If the channel is busy, an ACKD1W acknowledge 388 is sent back. When the current voice conversation is timed out, all data fleets will be serviced before the next voice allocation is made.

Data allocation is performed by sending a TOKD 390 with the ID of one data fleet. A brief period of time 392, typically five seconds, is allocated during which the first requesting data mobile fleet is uninhibited and may transmit and receive data. At the end of the repeat period, the next data mobile fleet is authorized in the same manner, until all requesting data mobiles have been serviced. Then the first fleet in the normal voice queue is assigned the channel. The fact that data requests are granted before voice requests is not objectionable because of the brief allocation of time for data. For the same reason, the LIFO instead of a FIFO process for data requests is acceptable. The process of assigning the channel to data traffic before voice traffic is evident in FIG. 10.

Since all data requests are serviced before the next voice assignment, the decoding of a TOK (voice) by a data mobile indicates that the data mobile missed its assignment. It may then re-request at the next request period. The more complex queue updating performed for voice requests is not needed for data requests.

A Queued Community Repeater Controller is a novel and necessary component of the Queued Community Repeater system. Its operation as described provides control of a unique radio communications system which offers a significant improvement in service over that of current radio communications systems. It should be realized, of course, that modifications and variations which may be made on this QCR Controller still fall within the true spirit and scope of this invention.

We claim:

1. A central controller for a single channel communications system regulating access by a plurality of remote units to the single channel, each remote unit associated with one of a plurality of predetermined groups of remote units and each remote unit adapted to request service on the channel and, after permission is granted, to transmit a message on the channel, comprising:

means for detecting an end-of-transmission condition of a first remote unit of a first group;

means, responsive to said end-of-transmission condition detection, for establishing a period of time on the single communications channel during which a remote unit of a second group may request service;

means for processing a received second group remote unit request for service;

storage means for storing said processed remote unit request in a queue with other remote unit requests;

means for maintaining a grant of service to said first group following said period of time whereby a second remote unit of said first group may transmit;

means for revoking said first group grant of service if said second remote unit does not transmit; and means for granting said request for service of said second group remote unit in accordance with a priority in said storage means when said first group grant of service is revoked.

2. A central controller in accordance with claim 1 wherein said period of time establishing means further comprises means for reducing contention between requesting remote units by intermittently causing remote units to randomly select one of two response windows in which to transmit a request for service.

3. A central controller in accordance with claim 1 wherein said central controller further comprises means for generating a signal for transmission to said remote units which indicates the commencement of said established period of time and acknowledges a previous remote unit request for service.

4. A central controller in accordance with claim 1 wherein said granting means further comprises means for recalling remote unit requests for service from said storage means on a first-in first-out priority.

5. A central controller in accordance with claim 1 wherein said granting means further comprises means for authorizing reception by said second group of remote units subsequent to said second group grant of service whereby said second group of remote units will be activated to receive transmission by said requesting second group remote unit.

6. A central controller in accordance with claim 1 wherein said central controller further comprises first timing means for timing remote unit activity on said channel in order to revoke said grant of service if said channel is unused for a predetermined period of time.

7. A central controller in accordance with claim 6 wherein said central controller further comprises second timing means for timing the duration of remote unit transmission on said channel in order that said grant of service may be revoked after the expiration of a predetermined period of time.

8. A central controller in accordance with claim 1 wherein said central controller further comprises means for immediately granting service to a requesting remote unit when the single channel has been unused for a period of time.

9. A central controller in accordance with claim 1 wherein said central controller further comprises a second storage means for storing requests for service from remote units equipped with data devices, thereby providing a capability of separately processing data remote unit requests.

10. A method of control for a central controller regulating the access of a plurality of remote units to a single communications channel for the purpose of transmitting a message, each remote unit associated with one of a plurality of predetermined groups of remote units, comprising the steps of:
- detecting an end-of-transmission condition of a first remote unit of a first group;
- establishing a period of time on the single communications channel, in response to said end-of-transmission condition, during which a remote unit of a second group may request service;
- processing a received second group remote unit request for service;
- storing said processed remote unit request in a queue with other remote unit requests;
- maintaining a grant of service to said first group following said period of time whereby a second remote unit of said first group may transmit;
- revoking said first group grant of service is said second remote unit does not transmit; and
- granting said request for service of said second group remote unit in accordance with a priority determined by said storage step when said first group grant of service is revoked.

11. The method in accordance with claim 10 further comprising the step of generating a signal for transmission to said second group remote units which indicates the commencement of said period of time and acknowledges a previous remote unit request for service.

12. The method in accordance with claim 10 further comprising the step of recalling remote unit requests for service in a first-in first-out priority.

13. The method in accordance with claim 10 further comprising the step of authorizing reception by said second group of remote units subsequent to said second group service granting step whereby said second group of remote units will be activated to receive a transmission by said requesting second group remote unit.

14. The method in accordance with claim 10 further comprising the step of timing the activity of remote units on the single channel in order to revoke said grant of service if said channel is unused for a predetermined period of time.

15. The method in accordance with claim 10 further comprising the step of timing the duration of remote unit transmission on said single channel in order that said grant of service may be revoked after the expiration of a predetermined period of time.

16. The method in accordance with claim 10 further comprising the step of granting service immediately to a requesting remote unit when the single channel has been unused for a period of time.

17. The method in accordance with claim 10 further comprising the step of processing requests for data service from remote units equipped with data devices independent of remote units not so equipped.

* * * * *

UNITED STATES PATENT AND TRADEMARK OFFICE
CERTIFICATE OF CORRECTION

PATENT NO. : 4,554,677

DATED : November 19, 1985

INVENTOR(S) : Paul F. Smith, et al.

It is certified that error appears in the above-identified patent and that said Letters Patent is hereby corrected as shown below:

In Column 13, line 17, delete "is" and insert --if--.

Signed and Sealed this

Fifteenth Day of April 1986

[SEAL]

Attest:

Attesting Officer

DONALD J. QUIGG

Commissioner of Patents and Trademarks